United States Patent [19]

Snell

[11] 4,292,001
[45] Sep. 29, 1981

[54] SHAFT COUPLING

[75] Inventor: Leonard S. Snell, Bristol, England

[73] Assignee: Rolls-Royce Limited, London, England

[21] Appl. No.: 72,099

[22] Filed: Sep. 4, 1979

[30] Foreign Application Priority Data

Sep. 19, 1978 [GB] United Kingdom ............... 37310/78

[51] Int. Cl.³ .......................... F16B 7/18; F16D 3/18
[52] U.S. Cl. ..................................... 403/359; 403/298
[58] Field of Search ................. 403/359, 298; 64/9 R

[56] References Cited

U.S. PATENT DOCUMENTS

| 2,785,550 | 3/1957 | Petrie | 403/359 X |
| 3,541,871 | 11/1970 | Burrell | 403/359 X |
| 3,622,185 | 11/1971 | Rosan, Sr. et al. | 403/359 X |

FOREIGN PATENT DOCUMENTS

| 1097515 | 2/1955 | France | 64/9 R |
| 52-40248 | 3/1977 | Japan | 403/359 |
| 454291 | 9/1936 | United Kingdom | |
| 1495565 | 12/1977 | United Kingdom | 403/359 |
| 1501219 | 2/1978 | United Kingdom | |

Primary Examiner—James Kee Chi
Attorney, Agent, or Firm—Stevens, Davis, Miller & Mosher

[57] ABSTRACT

In a coupling (9) between a hub (10) and a shaft (11) internal splines (12) of the hub are interdigitated with external splines (13) of the shaft. The splines are helical. The hub and shaft are further connected by axial pins (14) arranged in bores (15) which are parallel to the common axis (16) of the hub and the shaft and which intersect the interdigitated splines. A screw (21) in the hub engages an end (24) of the shaft. When the screw is tightened the hub is drawn along the hub. The different helix angle of zero result in that the hub becomes locked against axial movement on the shaft and the splines of the hub are urged circumferentially into engagement with the splines of the shaft thereby to take up circumferential clearance between them. The force applied by the screw applies compression to the shaft and tension to the hub so that Poisson's Law opperates to close radial clearance between the hub and the shaft.

10 Claims, 12 Drawing Figures

SHAFT COUPLING

DESCRIPTION

This invention relates to shaft couplings.

It is known to provide a coupling between a hub and a shaft comprising axial splines having flanks which transmit torque between the hub and the shaft, and further comprising a shoulder on the shaft at one end of the hub and a nut on the shaft at the other end of the hub whereby to clamp the hub axially against the shoulder. In such a coupling it is not always possible to establish firm contact between the torque-transmitting flanks of the splines. It is an object of this invention to reduce or overcome this difficulty.

According to this invention there is provided a shaft coupling comprising two relatively inner and outer members having a common axis, means defining first surfaces provided on the respective members in circumferentially confronting relationship, means defining second surfaces provided on the respective members in circumferentially confronting relationship, the first and second surfaces extending at different helix angles relative said axis, urging means for urging the members relatively axially, said first and second surfaces co-operating to lock the members against relative axial movement and to impart to the members opposing circumferential forces urging the members into engagement at said first and second surfaces respectively.

A particular difficulty of the known arrangement is that the force applied by the nut places the shaft into tension and the hub into compression. Under these circumstances the diameter of the shaft ends to reduce in accordance with Poisson's Law. This may result in radial separation between the hub and the shaft. If the spline flanks are inclined to the radial, said radial separation also results in circumferential separation of the flanks of the splines and further increases the difficulty of establishing firm contact between those flanks. The nut has to be done up with high torque to ensure safety against release, and the greater that torque the greater the separation of the flanks. It is a particular object of this invention to overcome this difficulty. Accordingly, the invention includes a coupling in which the said means for urging the members relatively axially are arranged to place the outer member into tension and the inner member into compression.

Other more specific aspects of the invention will become apparent from the following description and claims.

Examples of this invention will now be described with reference to the accompanying drawings wherein.

Figure 1:
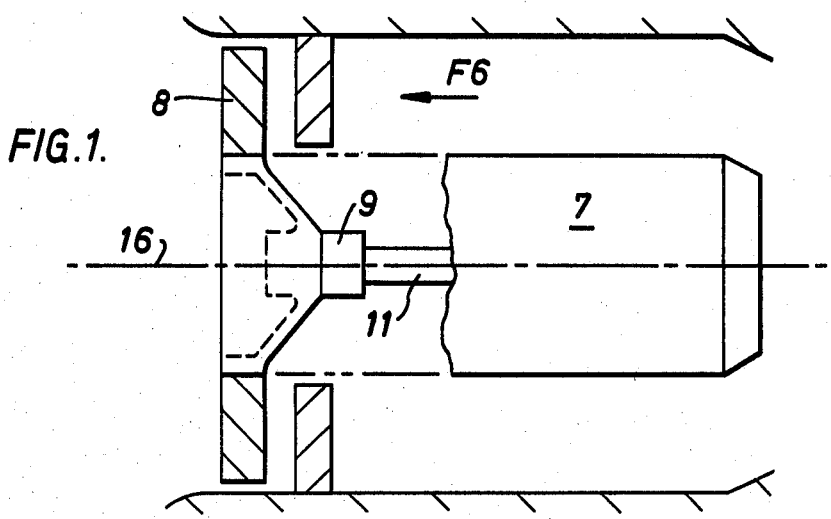
FIG. 1 is a diagrammatic side elevation of a gas turbine power plant embodying a shaft coupling according to this invention.

Referring to FIG. 1, the power plant comprises a gas turbine engine 7 having an output shaft 11 connected to drive a fan 8 through a coupling 9.

Figure 2:
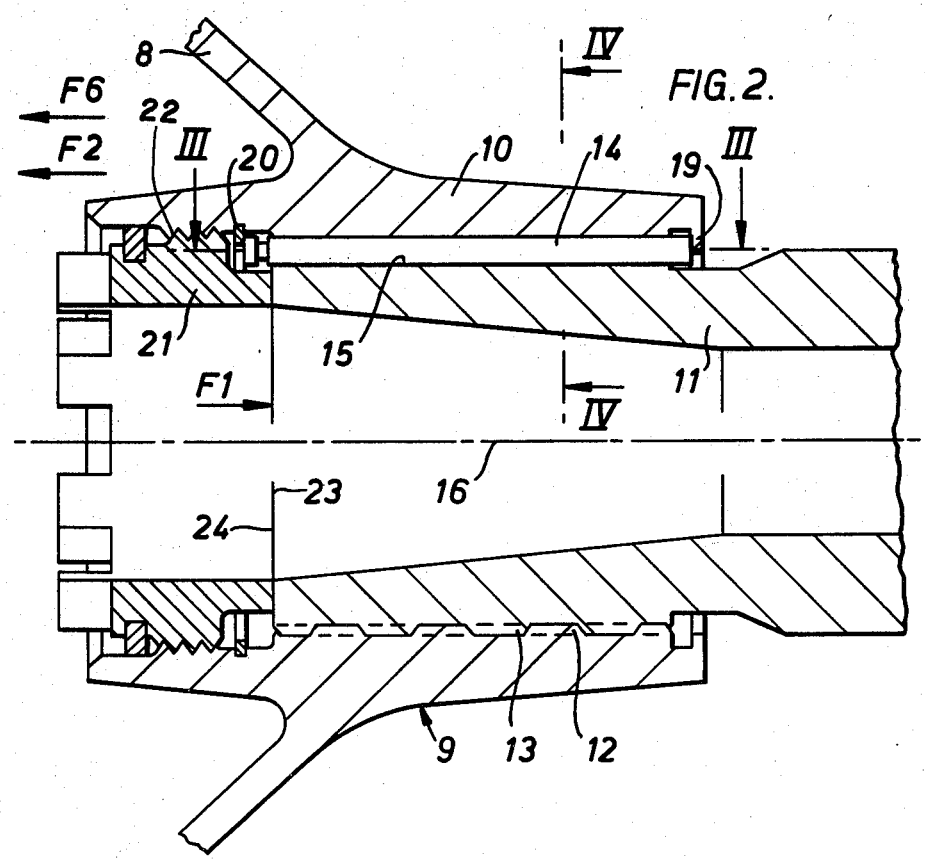
FIG. 2 is an enlarged sectional detail of FIG. 1 and shows a first example of the coupling.
Figure 3:
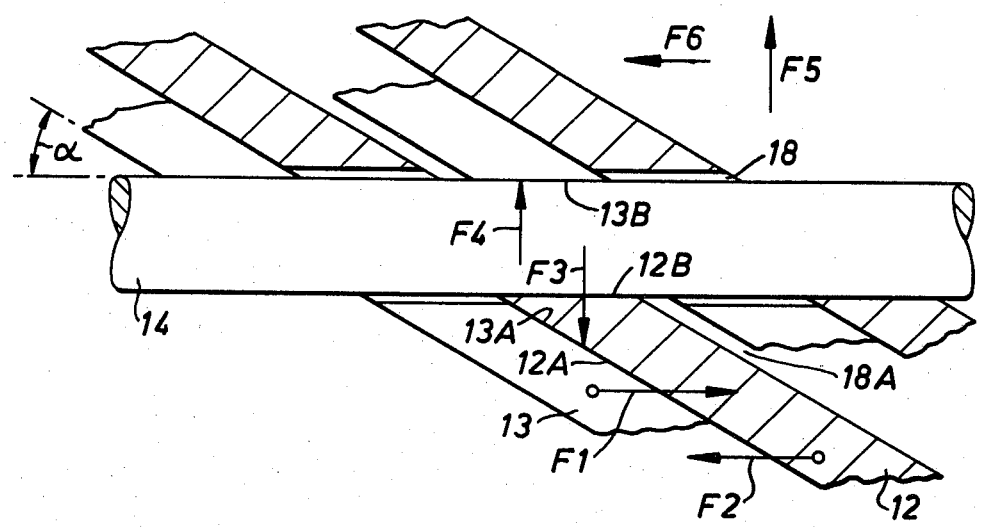
FIG. 3 is a developed section on the line III—III in FIG. 1.
Figure 4:
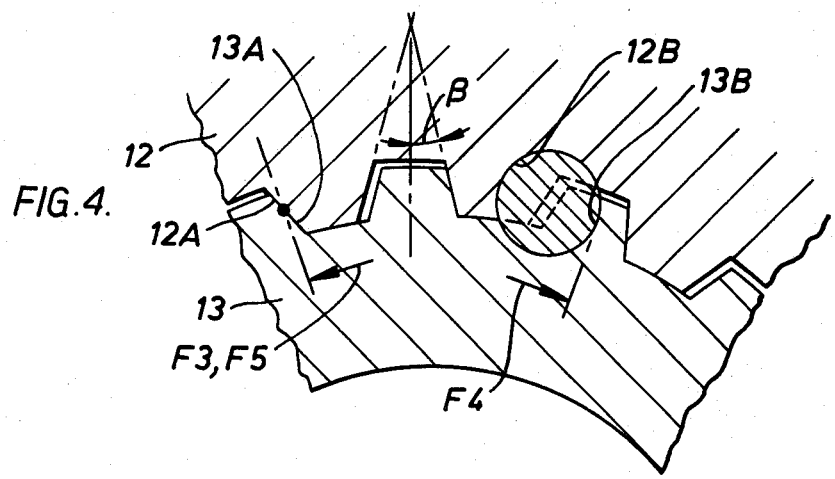
FIG. 4 is a section on the line IV—IV in FIG. 1 further enlarged.

Referring now also to FIGS. 2 to 4, the coupling 9 comprises an outer member or hub 10 having internal helical splines 12 interdigitated with external helical splines 13 of an inner member constituted by the shaft 11. The members 10,11 have a first pair of confronting surfaces being respectively helical surfaces 12A of the splines 12 and helical surfaces 13A of the splines 13. The surfaces 12A, 13A are in direct engagement and transmit the torque of the shaft 11 to the hub 10. The surfaces 12A,13A have a helix angle $\alpha$ with the common axis 16 of the members 10,11. At least three cylindrical intermediate members on pins 14 are arranged in respective bores 15 which are parallel to the axis 16 and which intersect the splines 12,13. The members 10,11 have a second pair of confronting surfaces being the surfaces 12B,13B of the bores 15 lying respectively in the splines 12,13. The surfaces 12B,13B are spaced circumferentially from the surfaces 12A,13A and are or course separated by the intermediate members 14. A screw 21 arranged in a nut thread 22 in the hub 10 has an end 23 abutting a confronting end 24 of the shaft 11 so that when the screw is tightened it applies an axial force F1 against the shaft end and an opposite force F2 urging the hub 10 axially along the shaft in a direction toward the end 24. In view of the different helix angles of the surface 12A,13A and 12B,13B (the helix angle of the surfaces 12B,13B is of course zero) the forces F1,F2 co-operate to wedge the hub against axial movement on the shaft. As a result there occurs a circumferential component force F3 urging the surfaces 12A of the hub against the surfaces 13A of the shaft and an opposite circumferential force F4 transmitted through the pins 14 between the surfaces 12B,13B. The forces F3,F4 eliminate an circumferential clearance between the splines 12,13, in particular between the driving surfaces 12A,13A. A circumferential force F5 applied by the shaft to rotate the fan can therefore act on the hub without encountering any said clearance. A force F6 being the aerodynamic load on the fan 8 acts in the same sense as the force F2 applied by the screw and reinforces the effect thereof, i.e. contributes to the firmness of engagement of the driving surface 12A,13A. This means that the screw need only be tightened with a relatively moderated pre-load torque to produce an initial loading of the surfaces 12A,13A. Nevertheless, when the stresses produced by the screw 21 are taken into account it will be noted that the screw places the shaft 11 into compression and the hub 10 into tension. This means that the outside diameter of the shaft tends to increase while the inside diameter of the hub tends to decrease thereby to improve the engagement between the splines 12,13 especially insofar as the flanks of these splines, i.e. the surfaces 12A,12B, are inclined to the radial as shown by the angle $\beta$ in FIG. 4. The screw 21 is connected to the hub by a conventional locking device, not shown, to prevent release of the screw due to vibration. However, if it should happen that the screw is accidentally released, the hub is still retained on the shaft by the pins 14. A shoulder 19 and a circular clip 20 both on the hub 10, retain the pins 14 against sliding from the bores 15. For disassembly, when the screw 10, clip 20 and pins 14 are removed, the hub 10 can be drawn readily over the end 24 of the shaft, the reverse operations applying for re-assembly.

To aid illustration, regions where there is no pressure between surfaces due to the forces F1,F2 are indicated to an exaggerated extent as clearances, e.g. at 18,18A in FIG. 3.

Figure 5:
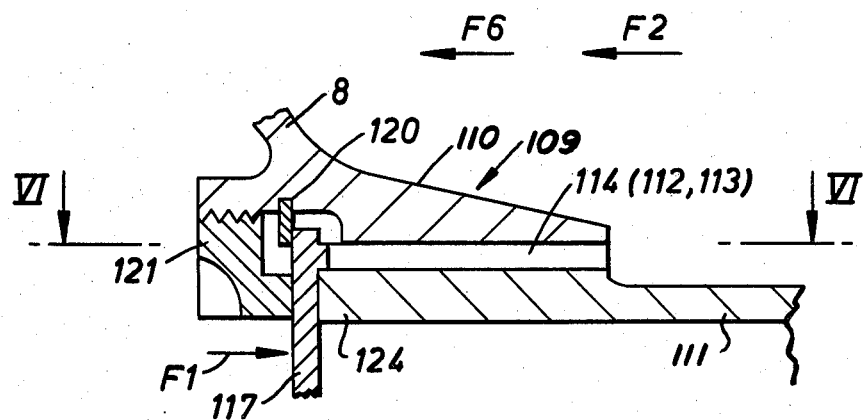
FIG. 5 is a view similar to FIG. 2 but showing a second example of the coupling.
Figure 6:
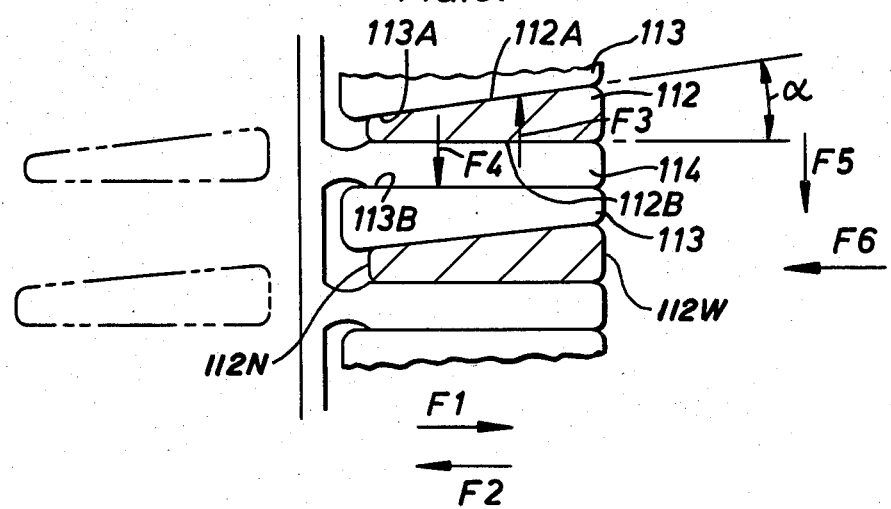
FIG. 6 is a developed section on the line VI—VI in FIG. 5.
Figure 7:
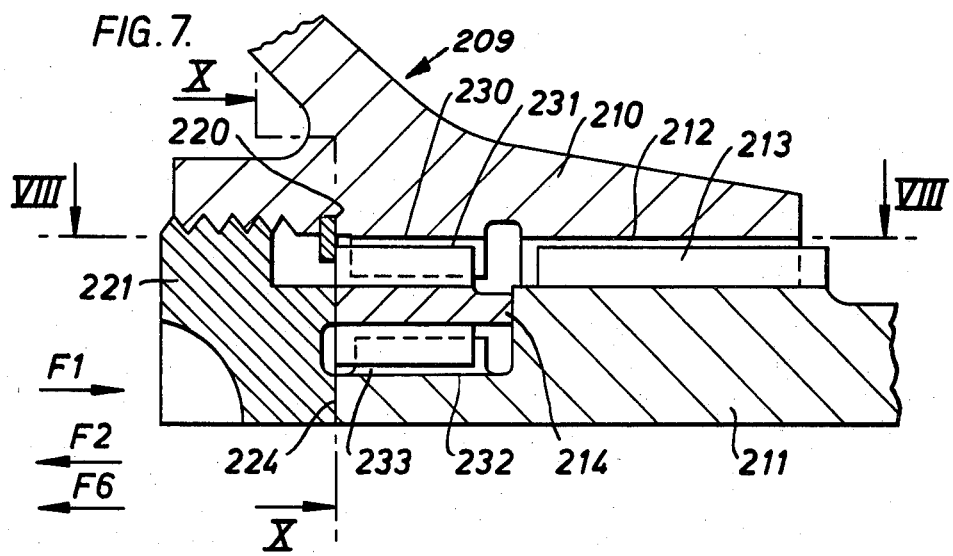
FIG. 7 is a view similar to FIG. 2 but showing a third example of the coupling.
Figure 8:
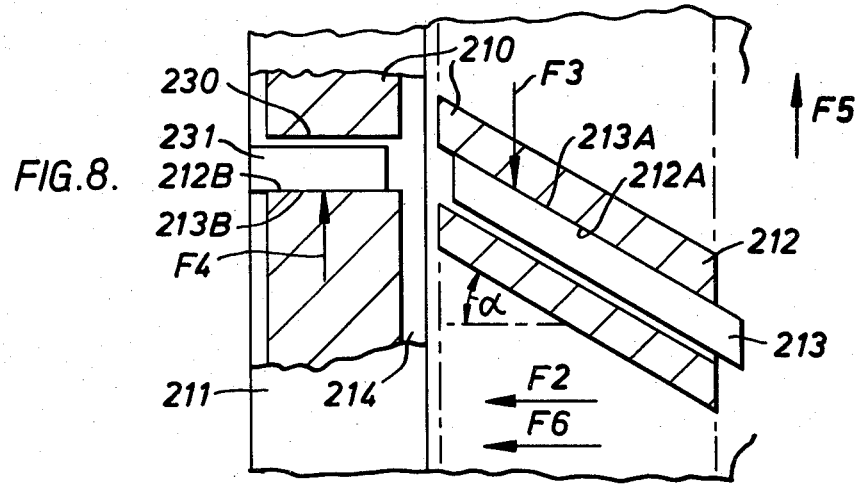
FIG. 8 is a developed section on the line VIII—VIII in FIG. 7.

Referring to the example shown in FIGS. 5 and 6, a coupling 109 comprises a hub 110 having internal splines 112 interdigitated with external splines 113 of a shaft 111. The splines 112 have helical first surfaces 112A confronting and engaging helical first surfaces 113A of the splines 113. The surfaces 112A,113A have a helix angle $\alpha$. Further the splines 112 have axial second surfaces 112B confronting axial second surfaces 113B of the splines 113 in spaced apart relationship thereto. Being axial, the surfaces 112B,113B may be regarded as having a zero helix angle. Each two confronting axial surfaces 112B,113B are separated by an axially extending intermediate member 114 required to make possible assembly and dis-assembly of the hub as explained later hereinbelow. The members 114 are integral with a ring 117 abutting an end 124 of the shaft and retained in position by a clip 120. When a screw 121 in the hub 110 is tightened against the ring 117 the hub 110 is urged axially along the shaft 111 and toward the end 124 thereof by a force F2. The different helix angles of the surfaces 112A,113A and 112B,113B co-operate to wedge the splines 112 between the splines 113 and the members 114. As a result there occurs a circumferential force F3 urging the surfaces 112A against the surfaces 113A and an opposite circumferential force F4 transmitted by the members 114 between the surfaces 112B,113B. A circumferential force F5 applied by the shaft 111 to rotate the fan 8 can therefore act on the hub without encountering any clearance between the driving surfaces, i.e. the surfaces 112A,113A of the splines. The aerodynamic force F6 on the fan 8 acts in the same sense as the force F2 applied by the screw and combines with that force to maintain the wedging action and thus retain firm engagement at the surfaces 112A,113A. As in the example of FIGS. 2 to 4, the screw 121 applies compression to the shaft 111 and tension to the hub 110 with the beneficial effects stated.

Removal of the hub 110 from the shaft 111 requires removal of the screw 121 and clip 120, and withdrawal of the ring 117 together with the inserts 114. The hub 110 is then free to be slid from the shaft over the end 124 thereof. It will be seen that each spline 112 is a wedge having a wide and a narrow end 112W and 112N situated respectively remote from and adjacent to the end 124 of the shaft. The removal of the members 114 enables the wide ends 112W to pass, as shown in chain-dotted lines (FIG. 6), through the relatively narrow clearance between the splines 113 at the end 124 of the shaft. Correspondingly, on assembly, the inserts 114 are necessary for filling the clearance which unavoidably occurs between the splines 112,113 when the hub is in the assembled position shown in full line.

Referring to the example shown in FIGS. 7 to 10, a coupling 209 comprises a hub 210 having internal splines 212 interdigitated with external helical splines 213 of a shaft 211. The splines 212 have helical first surfaces 212A confronting and engaging helical first surfaces 213A of the splines 213. The surfaces 212A,213A have a helix angle $\alpha$. Further the hub 210 has internal axial splines 230 interdigitated with external splines 231 of an annular intermediate member 214 which has internal axial splines 232 interdigitated with external splines 233 of the shaft 211. The splines 230,231 are spaced axially from the splines 212,213 and have confronting and engaging second surfaces 212B,213B. The shaft 211 has an end 224 engaged by a screw 221 in the hub 210. When the screw is tightened the hub 210 is urged axially along the shaft toward the end 224 thereof by a force F2. The different helix angles of the surfaces 212A,213A and 212B,213B cause the hub to be locked axially on the shaft 211 and generate a circumferential force F3 urging the surfaces 212A against the surfaces 213A. A corresponding opposite force F4 occurs at the surfaces 212B,213B. The forces F3,F4 eliminate any clearance between the driving surfaces, i.e. the surfaces 212A,213A of the hub and the shaft. The member 214, having axial splines, is easily removed or inserted during dis-assembly or assembly of the hub. Effectively, the member 214 forms part of the shaft 211, the splines 232,233 being provided to make possible withdrawal and insertion of the member 214 for purposes of dis-assembly and re-assembly. The splines 232,233 may be replaced by any convenient form of securing the member 214 to the shaft 211. It is also to be noted that the intermediate member 214 is located in position between the screw 221 and the end 214 of the shaft although a clip 220 is provided as an additional safeguard for retaining the member 214.

Figure 11:
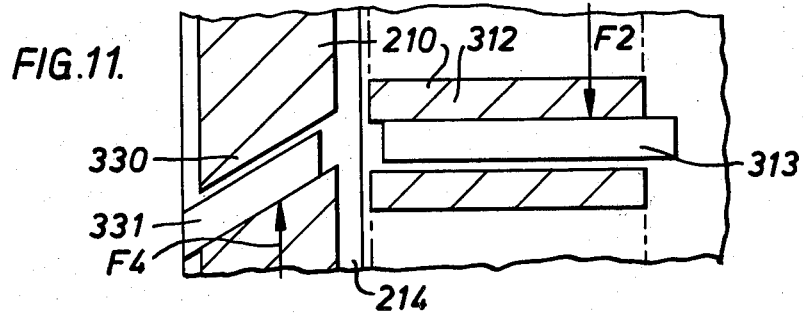
FIGS. 11 and 12 are views similar to FIGS. 8 and 9, respectively, but showing a modification.

In the modification shown in FIG. 11, the helical splines 212,213 of FIGS. 7 to 10 are replaced by axial splines 312,313 and the axial splines 230,231, of FIGS. 7 to 10 are replaced by helical splines 330,331.

Figure 9:
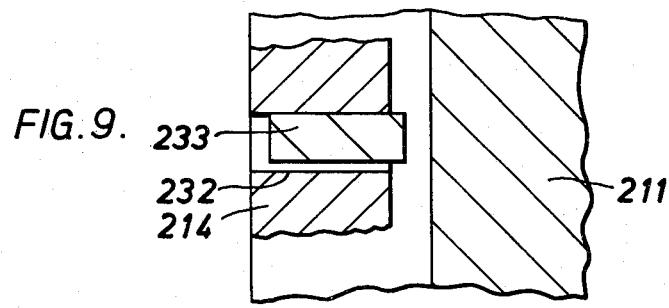
FIG. 9 is a developed section on the line IX—IX in FIG. 7.
Figure 10:
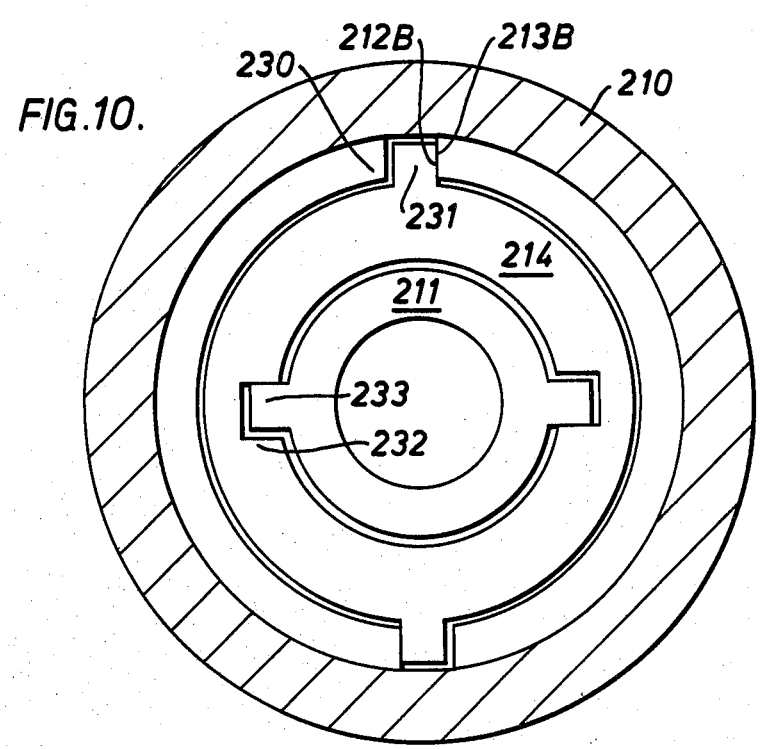
FIG. 10 is a developed view on the line X—X in FIG. 7.
Figure 12:
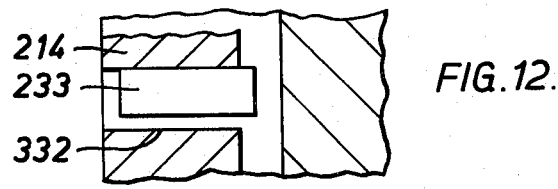

In FIG. 12, the modified spline 332 replaces the spline 232 of FIG. 9.

I claim:

1. Shaft coupling comprising two relatively inner and outer members having a common axis, means defining first surfaces provided on the respective members in circumferentially confronting relationship, means defining second surfaces provided on the respective members in circumferentially confronting relationship, the first and second surfaces extending at different helix angles relative to said axis, urging means for urging the members relatively axially, said first and second surfaces cooperating, by virtue of the action of the urging means, to lock the members against relative axial movement and to impart to the members opposing circumferential forces urging the members into engagement at said first and second surfaces respectively.

2. Coupling according to claim 1 wherein the means for urging the members relatively axially are arranged to place the outer member into tension and the inner member into compression.

3. Coupling according to claim 1 wherein the helix angle of one of said first and second surfaces is zero.

4. Coupling according to claim 1 wherein said first and second surfaces are arranged in circumferentially spaced relationship.

5. Coupling according to claim 1 wherein said first and second surfaces are arranged in axially spaced relationship.

6. Coupling according to claim 4 comprising an intermediate member situated between said second surfaces.

7. Coupling according to claim 6 comprising internal splines provided in the outer member, external splines provided on the inner member and interdigitated with the internal splines, said first surfaces being constituted by confronting helical surfaces of the inner and outer splines, said second surfaces being defined by confronting but circumferentially spaced apart axial surfaces of the splines, and said intermediate member being situated between said axial surfaces.

8. Coupling according to claim 6 wherein the first surfaces are defined by helical splines and the second surfaces are defined by opposite sides of an axial opening intersecting the first surfaces and containing said intermediate member.

9. Coupling according to claim 5 comprising an intermediate member releasably supported on the inner member against rotation relative thereto, and said second surfaces being defined respectively on the inner member and the intermediate member.

10. Coupling according to claim 9 comprising first spline means arranged to connect the members and defining said first surfaces, second spline means spaced axially from the first spline means and arranged to connect the outer member to said intermediate member and defining said second surfaces, and means for releasably securing the intermediate member to the inner member.

* * * * *